United States Patent
Jones, IV et al.

(10) Patent No.: US 7,457,382 B1
(45) Date of Patent: Nov. 25, 2008

(54) ASYMMETRIC WIRELESS PROTOCOL COMMUNICATIONS WITH DISPARATE MODULATION AND RATE FOR UPSTREAM AND DOWNSTREAM TRAFFIC

(75) Inventors: Vincent K. Jones, IV, Redwood City, CA (US); Partho Mishra, Cupertino, CA (US); Greg Raleigh, Woodside, CA (US)

(73) Assignee: Qualcomm Incorporated, San Diego, CA (US)

( * ) Notice: Subject to any disclaimer, the term of this patent is extended or adjusted under 35 U.S.C. 154(b) by 494 days.

(21) Appl. No.: 10/809,559

(22) Filed: Mar. 24, 2004

Related U.S. Application Data

(63) Continuation-in-part of application No. 10/643,215, filed on Aug. 18, 2003, now Pat. No. 7,340,015.

(51) Int. Cl.
*H04B 7/10* (2006.01)
(52) U.S. Cl. .................................................... 375/347
(58) Field of Classification Search ................ 375/267, 375/347, 225; 370/208, 338, 204; 455/450
See application file for complete search history.

(56) References Cited

U.S. PATENT DOCUMENTS

| | | | |
|---|---|---|---|
| 6,212,240 B1 * | 4/2001 | Scheibel et al. | 375/261 |
| 6,725,015 B1 * | 4/2004 | Lin | 370/338 |
| 7,062,703 B1 * | 6/2006 | Keaney et al. | 714/807 |
| 2004/0125775 A1 * | 7/2004 | Rios | 370/338 |

* cited by examiner

*Primary Examiner*—Khai Tran
(74) *Attorney, Agent, or Firm*—Amin, Turocy & Calvin, LLP

(57) ABSTRACT

In a wireless network, data transmitted from a one station to another station is transmitted using the 802.11b protocol while data transmitted in the other direction is transmitted using an OFDM modulation of the 802.11g protocol. Data and acknowledgements might be transmitted using the same modulation, the same data rate or distinct data rates and/or distinct modulations. Communication between a first station and a second station might comprise: at the first station, transmitting data packets to the second station using a first data modulation and a first data rate; at the first station, transmitting acknowledgement packets to the second station in response to data packets received from the second station, using a first acknowledgement modulation and a first acknowledgement rate; and at the second station, transmitting data packets to the first station using a second data modulation and a second data rate; at the second station, transmitting acknowledgement packets to the first station in response to the data packets received from the first station, using a second acknowledgement modulation and a second acknowledgement rate, wherein the first data rate is distinct from at least one of the second data rate, the first acknowledgement rate, or the second acknowledgement rate.

17 Claims, 3 Drawing Sheets

ASYMMETRIC WIRELESS PROTOCOL COMMUNICATIONS WITH DISPARATE MODULATION AND RATE FOR UPSTREAM AND DOWNSTREAM TRAFFIC

CROSS-REFERENCE TO RELATED APPLICATIONS

This application is a continuation-in-part of U.S. patent application Ser. No. 10/643,215, filed Aug. 18, 2003, the contents of which are incorporated herein by reference.

FIELD OF THE INVENTION

The present invention relates generally to wireless networks and protocols and more particularly to communications between two communicators is such that different conditions are present for two directions of communication, leading to asymmetry of conditions.

BACKGROUND OF THE INVENTION

Wireless networks have become increasingly popular, as computers and other devices can be coupled for data communications without requiring wired connections between the network nodes. One set of standards for wireless networks is the IEEE 802.11 standards, but other wireless standards or protocols might be used instead.

In the IEEE 802.11 standards, there are at least two widely-used standards, 802.11a and 802.11b, and communication systems and devices might be required to support both standards and/or be required to operate in areas where both are being used. Enhancements to the 802.11 standards have been in place, such as the 802.11g standard that allows for OFDM transmissions (802.11a is an OFDM transmission protocol) in the 2.4 GHz band.

The 802.11a protocol supports OFDM transmissions in the 5 GHz band for data rates of 6 to 54 million bits per second ("Mbps"). The 802.11b protocol supports DSSS transmissions in the 2.4 GHz band for data rates of 1, 2, 5.5 and 11 Mbps. The 802.11g protocol mixes OFDM and DSSS protocols in the 2.4 GHz band for data rates of 1, 2, 5.5, 6, 9, 11, 12, 18, 24, 36, 48 and 54 Mbps. Data transmissions are well known for these protocols, so they need not be set forth herein. They are described, for example, in ANSI/IEEE Std 802.11, 1999 Edition; IEEE Std 802.11b, 1999; IEEE Std 802.11a, 1999/Amd 1:2000(E). Those references are incorporated by reference herein for all purposes.

The 802.11b protocol can be supported by a station with a lower power than the full data rate range of the 802.11g protocol. One reason for this is that the 1 to 11 Mbps transmissions can be received at a lower signal-to-noise ratio (SNR) than the 12 to 54 Mbps transmissions. Another reason is that demodulation is simpler to implement for DSSS than for OFDM. Where power limitations exist at a station, 802.11b might be used instead of 802.11g. Where stations are not power-limited and higher data rates are needed, the 802.11g protocol might be preferred, as data rates can be as high as 54 Mbps. Additional rate extensions might be proposed and adopted as standard, but it is likely that the power-data rate trade-off will continue to exist, e.g., the trade-off between using more power to get a higher data rate or being limited to a lower rate to stay within a power budget of one or more stations in a wireless network.

It would be desirable to overcome the shortcomings of the prior art described above.

BRIEF SUMMARY OF THE INVENTION

In one embodiment of a wireless network, data communicated between wireless stations is communicated asymmetrically, with one direction using one protocol and the other direction using a different protocol. A wireless station can be an access point station or a client station, wherein an access point station provides connectivity for the client station to a distribution system. As an example, data might be transmitted in one direction using the 802.11b protocol while data transmitted in the other direction is transmitted using the 802.11g protocol.

In some embodiments, data is sent with one protocol and acknowledgements are returned in a second protocol distinct from the first protocol. Thus, the first and second protocols might be 802.11b and 802.11g and a client station might send data in one of those protocols and the access point station acknowledges the data using the other of those protocols. Likewise, the access point station can send data in one protocol and receive acknowledgements in the other protocol.

Using aspects of the present invention in a wireless network, data transmitted from one station to another station is transmitted using the 802.11b protocol while data transmitted in the other direction is transmitted using an OFDM modulation of the 802.11g protocol. Data and acknowledgements might be transmitted using the same modulation, the same data rate or distinct data rates and/or distinct modulations. Communication between a first station and a second station might comprise: at the first station, transmitting data packets to the second station using a first data modulation and a first data rate; at the first station, transmitting acknowledgement packets to the second station in response to data packets received from the second station, using a first acknowledgement modulation and a first acknowledgement rate; and at the second station, transmitting data packets to the first station using a second data modulation and a second data rate; at the second station, transmitting acknowledgement packets to the first station in response to the data packets received from the first station, using a second acknowledgement modulation and a second acknowledgement rate, wherein the first data rate is distinct from at least one of the second data rate, the first acknowledgement rate, or the second acknowledgement rate.

A further understanding of the nature and the advantages of the inventions disclosed herein may be realized by reference to the remaining portions of the specification and the attached drawings.

DETAILED DESCRIPTION OF THE INVENTION

Figure 1:
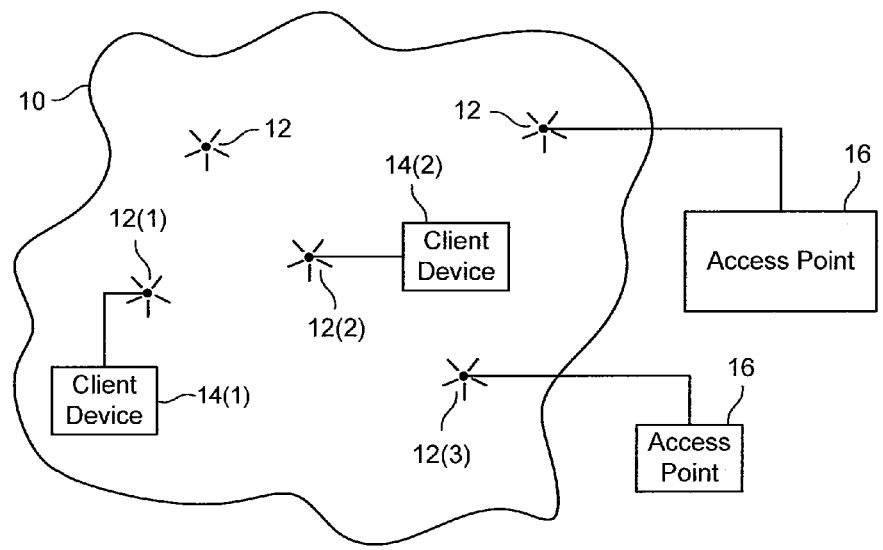
FIG. 1 is a block diagram of a simple wireless network that might use the present invention.

FIG. 1 illustrates a simple wireless network that might use the present invention. As shown in FIG. 1, a wireless network 10 comprises a plurality of stations 12 wherein each station 12 is capable of communicating with at least one other station 12 of wireless network 10. In specific implementations, wireless network 10 is a local area wireless network, as might be used within a building, campus, vehicle or similar environments.

In a specific embodiment, wireless network 10 is designed to be compliant with one or more of the IEEE 802.11 standards. However, it should be understood that other standards and nonstandard networks might be substituted therefore to solve problems similar to those solved in the 802.11 environment.

As shown, some of the stations are coupled to client devices 14, while other stations are coupled to access points 16. For example, station 12(1) is coupled to client device 14(1), while station 12(3) is coupled to an access point 16.

FIG. 1 is intended to be a simplified and generalized diagram of a wireless network. Interfering signal generators are not shown, but are assumed to be present. In normal operation, access points 16 typically provide connectivity between one or more client device 14 and a distribution system to which the access point is coupled, such as a wired LAN network interface or other distribution system.

Examples of client devices 14 include laptops, personal digital assistants (PDAs), or any other portable or semi-portable electronic device needing to communicate with other devices, or a stationary electronic device needing to communicate with other devices where a connection to a distribution system such as a LAN, WAN, intranet, VPN, etc. or the other devices is not available or easily provided. Access points 16 couple their respective stations to a distribution system. Examples of such distribution systems include the Internet, a local area network (LAN) or a public or private connection to a TCP/IP packet network or other packet network or networks.

In a typical operation, a plurality of client devices 14 are outfitted with circuitry and/or software that implements a station 12 functionality and one or more network access points are provided in wireless network 10 to provide access between such a client device and the other distribution system. A station coupled to a distribution system is referred to as an "access point". Just one example of the uses of such a system is to connect computers within a building to a network without requiring network wires to be run to each computer. In that example, the building would be outfitted with stationary access points coupled to the network that are within wireless communication range of wireless network cards in each of the computers coupled to the network.

Stations 12 might use all or part of the present invention in support of client devices 14 and/or access points 16. In some configurations, conventional stations might coexist in a wireless network with stations that perform according to aspects of the present invention. For example, station 12(1) might be a station that can receive 802.11b signals for a given connection and transmit 802.11g signals on that connection, and station 12(2) might be a conventional station that transmits/receives using a common protocol, such as 802.11b, while other stations might be present that operate with different protocols for different directions and yet other stations operate with a single protocol in both directions.

Figure 2:
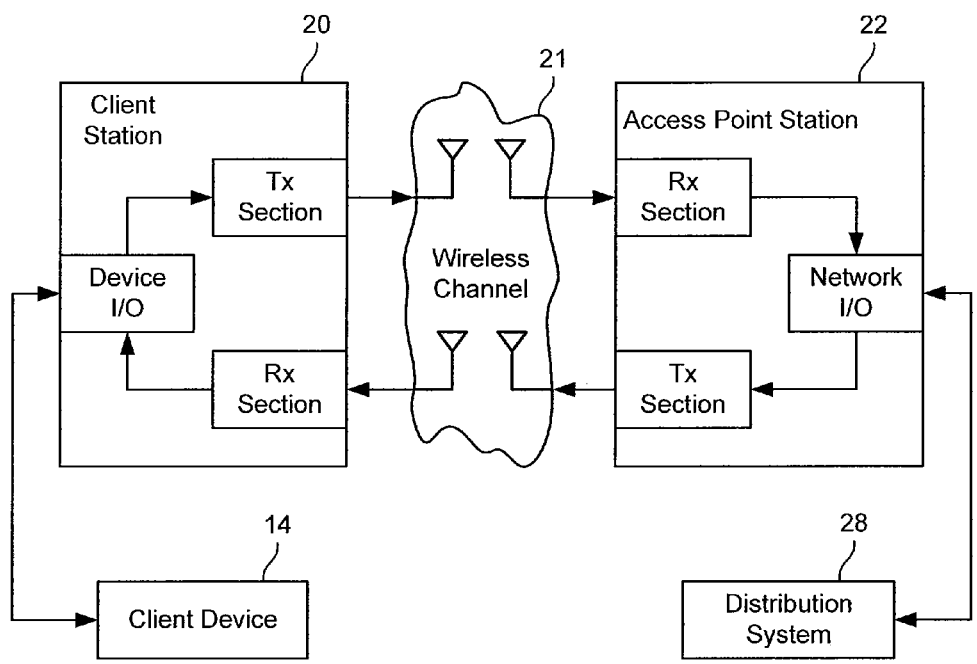
FIG. 2 is a block diagram illustrating the coupling between one device and one network connection of the wireless network shown in FIG. 1.

FIG. 2 shows in more detail the coupling between one client device and one distribution system. As shown there, client device 14 is coupled to a device I/O section of client station hardware 20. Client station hardware 20 includes a transmit section and a receive section, each coupled to the device I/O section. The transmit section transmits a signal through a wireless channel 21 to a receive section of access point station hardware 22. That receive section is coupled to a network I/O section, thus providing a data communication path from client device 14 to a distribution system 28. A path from distribution system 28 to client device 14 is also provided via the network I/O section of access point station hardware 22, a transmit section of access point station hardware 22, a receive section of client station hardware 20 and the device I/O section of client station hardware 20. The characteristics of wireless channel 21 depend on many factors, such as the location of client station hardware 20 and access point station hardware 22 as well as intervening objects, such as walls, buildings and natural obstructions, as well as influences by other devices and transmitters and receivers and signal-reflecting surfaces.

Typically, client station hardware 20 can be integrated in with client device 14. For example, where client device 14 is a laptop computer, client station hardware 20 might be an add-on PCMCIA card that is inserted into the laptop's PCMCIA slot. Access point station hardware 22 might be implemented as part of a wired network interface device that is just used to couple a wired network to a wireless network. Notwithstanding the typical implementation, it should be understood that nothing here prevents the diagram of FIG. 2 from being entirely symmetrical, i.e., wherein client station hardware 20 and access point station hardware 22 are nearly identical instances of hardware devices, however in many cases, a station that is an access point will be fixed and the station that is not an access point is in a portable or mobile device where power usage, cost, weight and/or size are considerations. Furthermore, communication is not limited to being between a client and an access point, as two clients can communicate and two access points can communicate.

Figure 3:
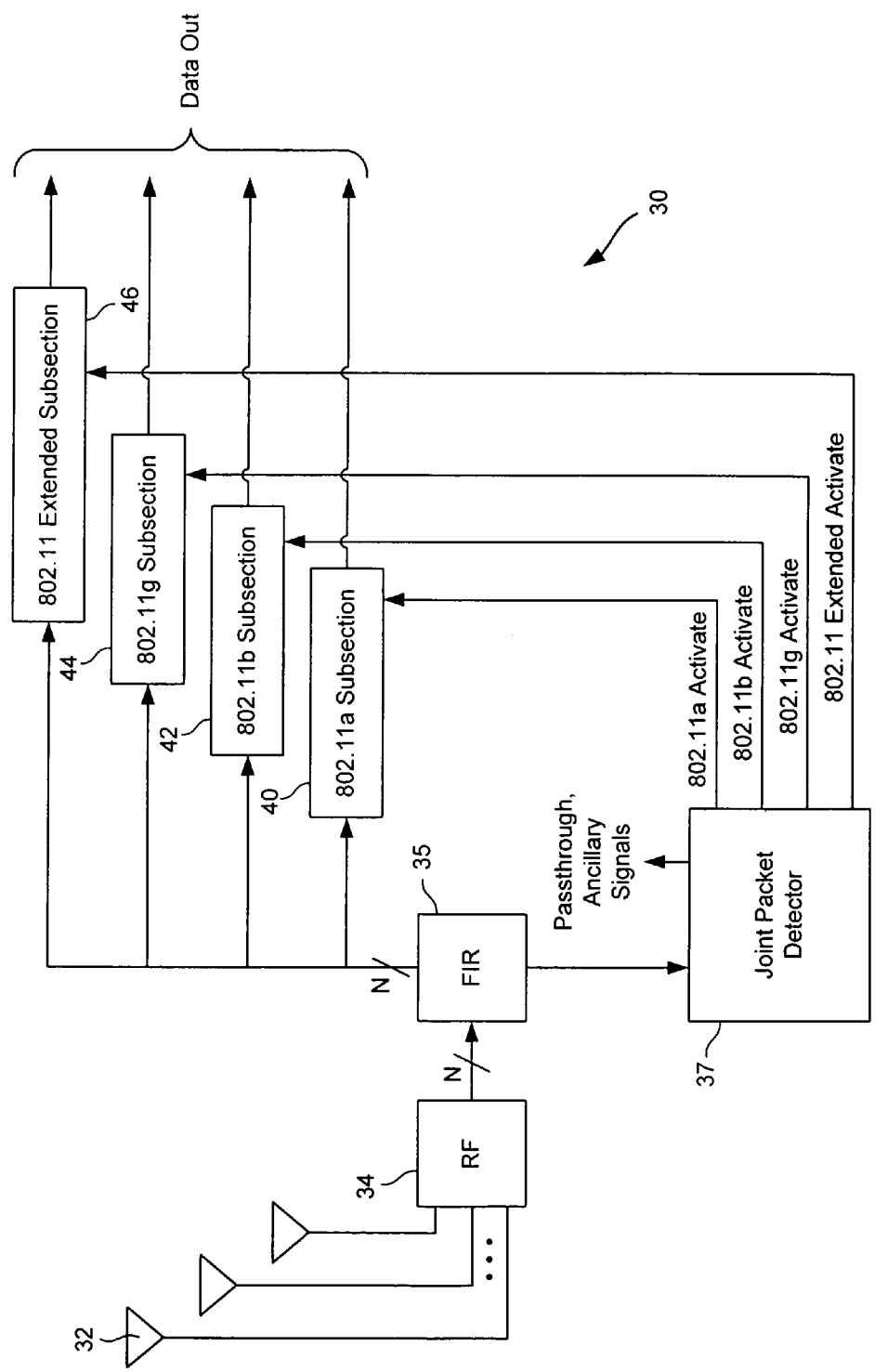
FIG. 3 is a block diagram of a receive section of station hardware as might be used in hardware illustrated in FIG. 2.

What follows is a detailed description of a receive section. FIG. 3 illustrates components of a receive section 30. Receive section 30 receives one or more signals over the wireless channel via antennas 32, which are initially processed by RF section 34. RF section 34 might, for example, process the signals to form baseband signals to form digital signal streams. As shown, receive section 30 also might include FIR(s) 35 and various subsections 40, 42, 44, 46 for processing 802.11a, 802.11b, 802.11g and 802.11 extended signals, respectively. Further details of elements of receive section 30 are more fully described herein and might be as shown in [U.S. patent application Ser. No. 10/376,347, filed on Feb. 26, 2003] to Steele et al., entitled "Multi-Antenna Wireless Receiver Chain With Vector Decoding" (hereinafter "Steele"); U.S. Provisional Patent Application No. 60/462,286 filed on Apr. 10, 2003 on behalf of Jones et al., entitled "Channel Estimation for IEEE 802.11A and Extended Rates" (hereinafter "Jones"); [U.S. patent application Ser. No. 10/642,070, filed on Aug. 15, 2003] to Awater et al., entitled "Joint Packet Detection In Wireless Communication System With One or More Receiver" (hereinafter "Awater"); and U.S. Provisional Patent Application 60/461,999, filed on Apr. 9, 2003 on behalf of Gardner et al., entitled "Modified Preamble Structure for IEEE 802.11A Extensions" (hereinafter "Gardner"), which are incorporated by reference herein for all purposes. It should be understood that the present invention is not limited to the particular receiver implementations shown here or there.

In the asymmetric modes described herein, transmission from a client station (e.g., a mobile and/or portable station) to an access point station, in one direction is one protocol and in another direction is another protocol taking into account asymmetric bandwidth needs in each direction and/or taking into account asymmetric power, sensitivity, cost, weight and/or size limitations.

In a specific example, a client station sends data to an access point using the 802.11b protocol, while the access point sends data to the client station using the 802.11g protocol. Where most of the data flowing between the client station and the access point is flowing downstream from the access point to the client station, the network capacity is effectively the capacity of the 802.11g protocol supported by, say, higher AP transmit power. Despite having less power at the client station, the link can be closed since 802.11b signals can be successfully received at lower SNR.

The 802.11g standard is a modification of the previous 802.11b standard that allows for additional, higher data rates. The 802.11b rates are 1, 2, 5.5 and 11 Mbps (four data rates), while the 802.11g rates are 1, 2, 5.5, 6, 9, 11, 12, 18, 22, 24, 33, 36, 48 and 54 Mbps (fourteen data rates). For ease of reference, the 1, 2, 5.5 and 11 Mbps data rates are referred to herein as the "11b" rates and the 6, 9, 12, 18, 24, 36, 48 and 54 Mbps data rates are referred to herein as the "OFDM" rates. Note that where the OFDM rates can be used, higher data throughput is possible. However, under some less-than favorable conditions, an 11b rate is preferred over an OFDM rate. For example, the required SNRs for 11b rates are lower than the SNRs for higher rate OFDM rates, so there are conditions where data can be successfully transmitted using the 11b rates but not as well using OFDM rates.

In a more general case, one station might use one rate and another station uses a different rate. Two stations might be a client station and an access point station (e.g., an "infrastructure" wireless network), two client stations (e.g., an "ad hoc" wireless network), or two access points (e.g., wireless distribution network). The modulations (e.g., 11b, OFDM) and the rates might differ between stations and between data packets in one direction and acknowledgements in the return direction.

In a specific example, assume that a first station is designated a "downstream station" and a second station is designated an "upstream station". Upstream data flow, from the downstream station to the upstream station might be at one modulation and rate and the downstream data flow might be at another modulation and rate. Alternatively, the modulation could be the same, but the rates might differ. Also, the upstream dataflow and the acknowledgements for the upstream dataflow (which flow downstream to the downstream station that is transmitting the upstream data), might be at a different modulation and rate from the modulation and rate used for the upstream data. Thus, four transmissions (data and acknowledgements in each of two directions) might all have different rates. One arrangement is where the upstream station sends downstream data and upstream acknowledgements using a first rate (preferably using the modulation, 11b or OFDM, for that rate, for compatibility) and the downstream station sends upstream data and downstream acknowledgements using a second rate that differs from the first rate and may or may not differ in modulation.

In several applications, a useful combination is where a first station transmits its data and acknowledgements of a second station's data packets using a first modulation and the second station transmits its data and acknowledgements of the first station's data packets using a second modulation different than the first modulation. As applies to specific protocols, specific embodiments might have the modulation of the first station being 11b and the modulation of the second station being OFDM. In that specific example, the first station would transmit using 11b and receive OFDM while the second station transmits using OFDM and receives 11b. Such stations could coexist in a wireless network with other stations that are not capable of such asymmetric communications, by communicating with those other stations using the same modulation (and possibly the same data rate) for transmitting and receiving with those other stations.

This asymmetry has significant implications where one of the receivers is more sensitive than the other. For example, if two stations are not near each other, or there are other reasons why significant noise is introduced, a more sensitive receiver can receive at a higher data rate while transmitting to the less sensitive receiver at a lower data rate. The receiver might be more sensitive because it uses innovations such as those described in Steele and U.S. Pat. No. 7,315,576 [U.S. patent application Ser. No. 10/376,060, filed on Feb. 26, 2003] to van Nee et al., entitled "System for Soft Symbol Decoding with MIMO Log-Map Detection" (hereinafter "van Nee"), which is incorporated by reference herein for all purposes.

Where two sensitive receivers are used, they can both handle low SNRs. However, where one receiver, such as the receiver in a client device is more sensitive than the receiver in an access point, the access point can transmit using OFDM data rates while the client device transmits using 11b rates. This is advantageous especially where the data flow is greater towards the client device than away from the client device—a typical scenario where the client device is consuming information from a remote server via the wireless network. Since access points are typically stationary devices and client devices are typically mobile or portable devices, device size, power consumption, computing power, antenna positioning and reliability would be expected to be more constrained in a client device relative to an access point, which could lead to situations wherein a client device with a sensitive receiver would be in range for receiving OFDM transmissions while the less sensitive receiver at the other end might be out of range for receiving OFDM transmissions.

Figure 4:
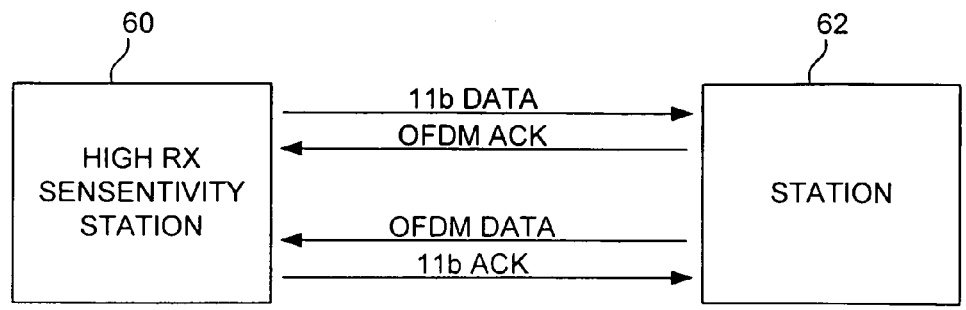
FIG. 4 is a block diagram illustrating data communication among two client devices.

The advantages also apply when the access point has a sensitive receiver, for example, one designed by Airgo Networks, Inc. In such cases, the access point station transmits using an 11b data rate, to be received by a less sensitive network interface card (NIC) supporting a client device, rather than an OFDM data rate, but receives data from the NIC at an OFDM data rate. Acknowledgements ("ACKs") might be transmitted in a similar manner, as shown in FIG. 4. As shown there, a first station device 60 transmits to a second station device 62 using an 11b data rate while receiving ACKs at an OFDM data rate. When the second station device 62 transmits data, it does so at an OFDM data rate while receiving ACKs at an 11b data rate. In this example, first station device 60 can be either an access point station or a client device station and second station device 62 can also be either an access point station or a client device station—nothing here prevents two client devices or two access points from using these techniques to communicate among themselves.

Figure 5:
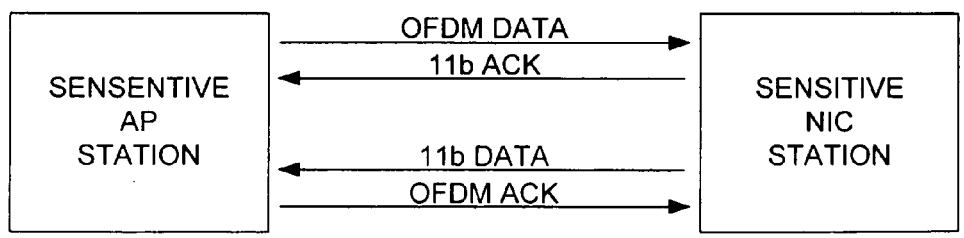
FIG. 5 is a block diagram illustrating data communication between an access point and a network interface card of a client device.

The rate at which station device 60 transmits 11b data need not be the same as the data rate at which station device 60 transmits 11b ACKs, but often a common rate is simpler and avoids the need to tear down and set up the transmitter and receiver processing chains.

Where two sensitive receivers are involved, such as two Airgo Networks devices, an asymmetry might still exist, such as a power constraint asymmetry. Assume, for example, that a sensitive access point is deployed and communications with a sensitive NIC and that the access point has a steady source of power, whereas the NIC is preferably a low-power device. This is desirable where the NIC draws power from a battery, such as the battery of a laptop, a cellular telephone, a PDA, or the like, where the battery must be carried or ported (so the size, and therefore the capacity of the battery is constrained). In such cases, 11b and OFDM rates might be used as indicated in FIG. 5. The NIC-to-AP link budget is often less than the AP-to-NIC link budget due to the lower transmit power available for the NIC to spend, however that need not always be the case.

Even where neither side is constrained in its use of transmit power, there are asymmetries. Some of these are due to, for example, variable transmit power, variable noise figure values for receiving radios and variable numbers of antennas used to increase receiver sensitivity. A transmitter's performance might depend on transmit power, its error vector magnitude, antenna gain and the like. In communications between an upstream station A and a downstream station B, the "downstream link budget" $L_D$ might be as shown in Equation 1, where $M_t$ refers to the number of transmit antennas used, $M_r$ refers to the number of receive antennas used, and NF refers to the noise figure, and the "upstream link budget" $L_U$ might be as shown in Equation 2.

$$L_D = TxPwr_A + Gain(M_{t_A}) + NF_B + SNR_B + Gain(M_{r_B}) \quad \text{(Equ. 1)}$$

$$L_U = TxPwr_B + Gain(M_{t_B}) + NF_A + SNR_A + Gain(M_{r_A}) \quad \text{(Equ. 2)}$$

Another source of asymmetry is that, for a given power amplifier, packets of 11b signals can be sent with more transmit power because they require less linearity than OFDM signals and thus can drive the power amplifier further in its dynamic range. Yet another source of asymmetry might be interference that is local to one side of the link, for example, computer noise generated from the CPU or other electronics. An AP is typically designed to have very low electromagnetic interference ("EMI"), so the local interference would likely be asymmetric.

As described above, a sensitive access point and a less sensitive client device (such as an access point designed by Airgo Networks and a client device using a station of another design), can benefit from the asymmetric transmissions described herein. Also, a sensitive access point with a sensitive client device with power constraints also benefits. Other cases might also benefit. For example, one station with high available transmit power and low receiver sensitivity (typically an access point, but not required) and another station (typically a client device station, but not required) with low available transmit power and high receiver sensitivity would also benefit from the asymmetric transmissions described herein. One situation where this is likely to be a common problem is where the client device is a personal digital assistant ("PDA"), which has very little transmit power available.

One or more stations in a wireless network might be programmed to determine on the fly its sensitivity relative to other stations in order to propose or control the differing modulations and rates used for communications. For example, a station might determine that it is a more sensitive receiver and then arrange so that it transmits using 11b modulation and receives using OFDM modulation, or some other combination.

A station can determine its relative sensitivity by control messages between stations that each have this capability. In one implementation, each station determines how well it can receive signals, and conveys its performance to other stations in control messages. Each station can then do rate adaptation to determine a rate for its transmissions based on its relative sensitivity, possibly taking into account other considerations, such as power limits, computing limits, etc. The rate selected by a station might be one of the 11b rates or one of the OFDM rates, using considerations such as those described above.

In another implementation, a station does not assume that any other station performs such rate adaptation or can send control information about sensitivity and instead attempts to determine its relative sensitivity from its own receptions, such as by noting its receiver SNR (as can be done using conventional techniques) and inferring a downstream rate from other events, such as a rate of packet loss determined by missing ACKs. This would allow a station to select a preferred modulation and a compatible rate for that modulation.

Using one or more aspects of the novel wireless stations and logic described above, improved throughput, power usage and other performance metrics can be obtained. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of wireless communication between a first station and a second station, the method comprising:
    at the first station, transmitting data packets to the second station using a first data modulation and a first data rate, wherein the first data modulation and the first data rate are predetermined using one or more attributes of the first station and the second station;
    at the first station, transmitting acknowledgement packets to the second station in response to data packets received from the second station, using a first acknowledgement modulation and a first acknowledgement rate, wherein the first acknowledgement modulation and the first acknowledgement rate are predetermined using one or more attributes of the first station and the second station;
    at the second station, transmitting data packets to the first station using a second data modulation and a second data rate, wherein the second data modulation and the second data rate are predetermined using one or more attributes of the first station and the second station; and
    at the second station, transmitting acknowledgement packets to the first station in response to the data packets received from the first station, using a second acknowledgement modulation and a second acknowledgement rate, wherein the second acknowledgement modulation and the second acknowledgement rate are predetermined using one or more attributes of the first station and the second station,
    wherein the first data rate is distinct from at least one of the second data rate, the first acknowledgement rate, or the second acknowledgement rate.

2. The method of claim 1, the first data modulation is distinct from at least one of the second data modulation, the first acknowledgement modulation, or the second acknowledgement modulation.

3. The method of claim 1, the first data modulation, the second data modulation, the first acknowledgement modulation, and the second acknowledgement modulation are selected from an 802.11b rate and an OFDM rate.

4. The method of claim 3, at least one of the first data modulation, the second data modulation, the first acknowledgement modulation, and the second acknowledgement modulation is an 802.11b modulation and at least one of the modulations is an OFDM modulation.

5. A method of wireless communication between a first station and a second station, the first station comprising a more sensitive receiver and the second station comprising a less sensitive receiver, the method comprising:

at the first station, transmitting data packets to the second station using a first modulation selected from a set of 802.11b modulations at a first data rate selected from a set of 802.11b rates;

at the first station, transmitting acknowledgement packets using a first acknowledgement modulation selected from the set of 802.11b modulations at a first acknowledgement rate selected from the set of 802.11b rates;

at the second station, transmitting data packets to the first station using a second modulation selected from a set of OFDM modulations at a second data rate selected from a set of OFDM rates; and at the second station, transmitting acknowledgement packets using a second acknowledgement modulation selected from the set of OFDM modulations.

6. The method of claim 5, wherein the first data rate and the first acknowledgement rate are different rates selected from the 802.11b rates.

7. The method of claim 5, wherein the first data modulation and the first acknowledgement modulation are different modulations selected from the 802.11b modulations.

8. The method of claim 5, wherein the second data rate and the second acknowledgement rate are different rates selected from the OFDM rates.

9. The method of claim 5, wherein the second data modulation and the second acknowledgement modulation are different modulations selected from the OFDM modulations.

10. The method of claim 5, the first station comprises a power-constrained device with limited transmission power and the second station comprises a device with a steady source of power.

11. A method of wireless communications with a first station, the method comprising:

transmitting a first data packet to a second station using a first wireless communication protocol, the first wireless communication protocol is predetermined using one or more attributes of the second station;

receiving a second data packet from the second station, the second data packet transmitted using a second wireless communications protocol, and the second wireless communication protocol is predetermined using one or more attributes of the first station receiving a first acknowledgment packet from the second station using a third wireless communication protocol in response to sending the first data packet to the second station, the third wireless communication protocol is predetermined using one or more attributes of the second station; and transmitting a second acknowledgment packet to the second station in response to receiving the second data packet from the second station, the second acknowledgment packet is transmitted using a fourth wireless protocol, and the fourth wireless communication protocol is predetermined using one or more attributes of the first station.

12. The method of claim 11, wherein the first wireless protocol and the third wireless communications protocols are different wireless communications protocols.

13. The method of claim 11, wherein the second wireless communications protocol and the fourth wireless communications protocol are different wireless protocols.

14. The method of claim 11, wherein the one or more attributes of the second station used to determine the first wireless communication protocol include whether the first station includes a weaker transmitter than the second station.

15. The method of claim 11, the one or more attributes of the first station used to determine the second wireless communication protocol include whether the second station includes a weaker transmitter than the first station.

16. The method of claim 11, wherein the one or more attributes of the second station used to determine the first wireless communication protocol include whether the first station includes a more sensitive receiver than the second station.

17. The method of claim 11, the one or more attributes of the first station used to determine the second wireless communication protocol include whether the second station includes a more sensitive receiver than the first station.

* * * * *